United States Patent
Rudy

(10) Patent No.: US 10,267,394 B2
(45) Date of Patent: Apr. 23, 2019

(54) METHOD FOR PRODUCING A PLANETARY SCREW DRIVE AND KIT FOR CARRYING OUT THE METHOD

(71) Applicant: SCHAEFFLER TECHNOLOGIES AG & CO. KG, Herzogenaurach (DE)

(72) Inventor: Dietmar Rudy, Kleinbundenbach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 650 days.

(21) Appl. No.: 14/893,327

(22) PCT Filed: Feb. 27, 2014

(86) PCT No.: PCT/DE2014/200095
§ 371 (c)(1),
(2) Date: Nov. 23, 2015

(87) PCT Pub. No.: WO2014/187453
PCT Pub. Date: Nov. 27, 2014

(65) Prior Publication Data
US 2016/0123446 A1    May 5, 2016

(30) Foreign Application Priority Data

May 21, 2013  (DE) .......................... 10 2013 209 293

(51) Int. Cl.
*F16H 25/22*     (2006.01)

(52) U.S. Cl.
CPC .............................. *F16H 25/2252* (2013.01)

(58) Field of Classification Search
CPC ....... F16H 25/20; F16H 25/22; F16H 25/2252
See application file for complete search history.

(56) References Cited

U.S. PATENT DOCUMENTS

2008/0196529 A1* 8/2008 Sugitani .............. F16H 25/2252
74/424.89

FOREIGN PATENT DOCUMENTS

| EP | 1978283 | 10/2008 |
|---|---|---|
| EP | 2048412 | 4/2009 |

* cited by examiner

*Primary Examiner* — Huan Le
(74) *Attorney, Agent, or Firm* — Volpe and Koenig, P.C.

(57) ABSTRACT

A method for producing a planetary screw drive and a kit for carrying out the method, in which a number of basic planetary roller sets composed of mutually dissimilar basic planetary rollers having different groove profiles are formed; wherein all planetary rollers belonging to a planetary roller set for lead screws with a same number of threads are taken from one particular basic planetary roller set; and wherein for each number of threads for a lead screw there is one particular basic planetary roller set, the basic planetary rollers of which are different from the basic planetary rollers of another particular basic planetary roller set.

7 Claims, 1 Drawing Sheet

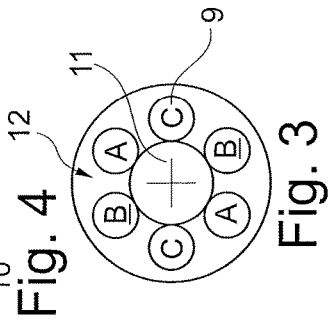
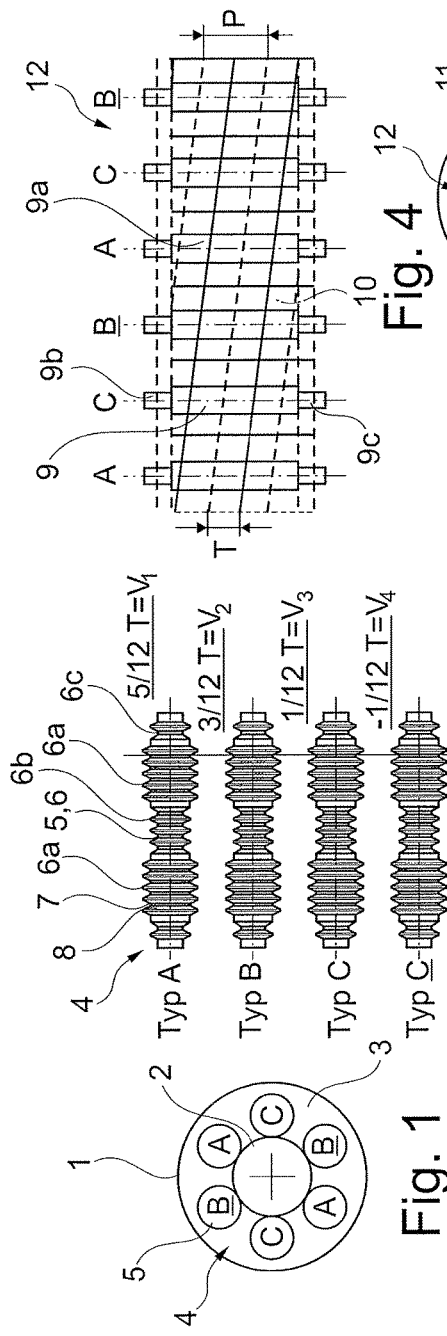
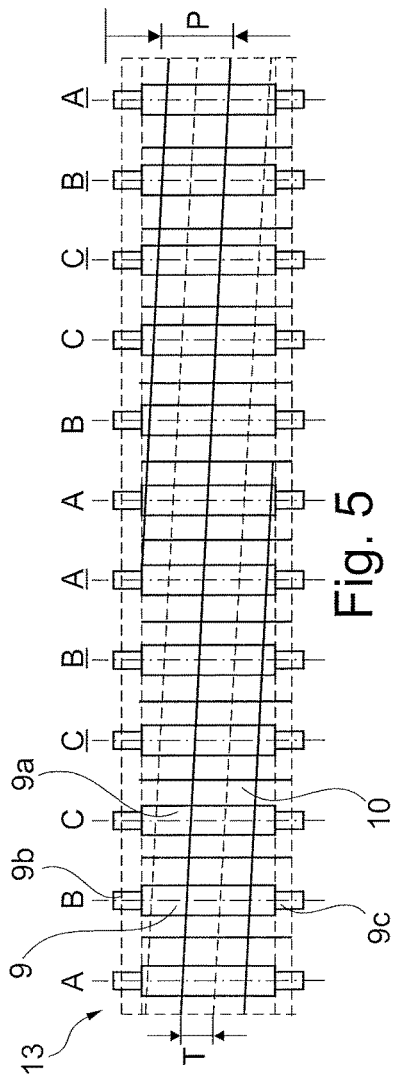

METHOD FOR PRODUCING A PLANETARY SCREW DRIVE AND KIT FOR CARRYING OUT THE METHOD

BACKGROUND

The present invention relates to a method for producing a planetary screw drive and to a kit for carrying out the method.

From EP 1978283 A2, a planetary screw drive has become known.

SUMMARY

The object of the present invention is to provide an alternative method for producing a planetary screw drive and a kit for carrying out the method.

This objective is achieved by the method and by the kit with one or more features of the invention.

A planetary screw drive that is produced with the method according to the invention has the following components: a threaded lead screw with a thread profile with n threads—where "n" is a natural number, a lead screw nut arranged on the threaded lead screw, a planetary roller set that is formed from multiple planetary rollers arranged distributed across the circumference, wherein a planetary roller-side groove profile of the planetary rollers of the planetary roller set is in rolling engagement with a nut-side groove profile of the lead screw nut and with the thread profile of the threaded lead screw.

The method according to the invention provides that multiple basic planetary roller sets are formed from basic planetary rollers that are different from each other with different planetary roller-side groove profiles, wherein all planetary rollers of a planetary roller set for threaded lead screws with the same number of threads are taken from a defined basic planetary roller set and wherein a defined basic planetary roller set is allocated to each number of threads of the threaded lead screws, wherein the basic planetary rollers of this planetary roller set are different from the basic planetary rollers of another defined basic planetary roller set.

A preferred method according to the invention provides that all of the planetary rollers of a planetary roller set for threaded lead screws with the same number of threads are taken, independent of the lead screw diameter, from a defined basic planetary roller set. The advantage lies in the simple allocation of the planetary rollers to the threaded lead screws; only the number of threads of the threaded lead screw must be taken into account in order to assemble a suitable planetary roller set from the associated basic planetary roller set.

The threaded lead screws can be single thread, that is, have a spiral groove wound helically around the lead screw axis. According to the application, multiple threads—for example, double thread or triple thread threaded lead screws could also be used. Multiple-thread threaded lead screws have multiple spiral grooves arranged in parallel, so that a load to be transferred can be distributed uniformly. In many cases, multiple-thread threaded lead screws have a larger lead and allow a larger stroke movement between the lead screw nut and threaded lead screw.

The planetary roller-side groove profile of all of the basic planetary rollers of a common basic planetary roller set differs from the basic planetary rollers such that the section of the groove profile in rolling contact with the threaded lead screw is arranged axially offset relative to the corresponding sections of the other basic planetary rollers of this basic planetary roller set. This difference enables an axially aligned arrangement of the planetary rollers about the threaded lead screw.

In the sense of this invention, "taken" means that each planetary roller of a planetary roller set is a copy of a basic planetary roller of the allocated basic planetary roller set and that it is possible to develop a complete planetary roller set from all or only a few of the basic planetary rollers and that it is possible to provide a multiple or one or more of the basic planetary rollers as planetary rollers for the planetary roller set.

While according to EP 1978283 A2 the planetary rollers of each planetary roller set for all variants of the planetary screw drive have an equal size pitch diameter, that is, the basic planetary rollers for all variants of planetary screw drives are derived from a common basic planetary roller set, the invention provides a separate basic planetary roller for each number of threads of the threaded lead screws. The pitch diameters of the basic planetary rollers within the common basic planetary roller set are equal, but different basic planetary roller sets have different pitch diameters on the respective basic planetary rollers. The pitch diameter describes the path of rolling contact between the planetary roller and threaded lead screw.

A defined basic planetary roller set is allocated to a threaded lead screw with only one thread and another defined basic planetary roller set is allocated to a threaded lead screw with, for example, two threads. The advantage of the invention lies in that, for each threaded lead screw type—that is, threaded lead screws with different numbers of threads—an optimum rolling contact of the planetary rollers with the threaded lead screw can be set. The requirement that exactly one basic planetary roller set is allocated to each threaded lead screw type allows this optimization.

A threaded lead screw with two threads has a specified pitch and a specified lead, wherein the pitch designates the axial distance between adjacent windings of the two threads and the lead designates the axial distance of a starting point and an ending point of one full winding of one of the threads. If the pitch, for example, of a double-thread threaded lead screw is exactly the same size as the pitch of a single-thread threaded lead screw, the lead of the double-thread threaded lead screw must be greater, that is, steeper. The more threads a threaded lead screw has, the greater the lead for a constant pitch. The planetary rollers are provided with a groove profile whose endless grooves are arranged parallel to a plane that is arranged perpendicular to the planetary roller axis. The greater the lead, the greater a lead angle of the thread profile is with respect to this plane. A planetary roller in rolling contact with thread flanks of the thread profile of the threaded lead screw is consequently arranged with its planetary roller axis for a single-thread threaded lead screw on a smaller diameter around the threaded lead screw and for a double-thread threaded lead screw with equal pitch on a greater diameter around the threaded lead screw. This means the rolling contact between the planetary roller and threaded lead screw wanders for increasing number of threads and equal pitch in the direction toward a tooth tip. The tooth tip is to be understood such that adjacent grooves of the planetary roller are bordered by endless teeth whose tooth flanks open into the tooth tip. The invention has found that a rolling contact optimized in terms of carrying capacity can be set when for each number of threads of the threaded lead screws, the planetary rollers can be taken from a defined basic planetary roller set whose basic planetary rollers are matched to the threaded lead screws with the provided number of threads.

The basic planetary roller sets can be designed so that basic planetary rollers of one basic planetary roller set cannot be confused with basic planetary rollers of another basic planetary roller set; this difference in the basic planetary roller sets can be enabled through significantly different pitch diameters of the basic planetary roller sets, but also in that the basic planetary roller sets are specially marked.

In one refinement according to the invention, each basic planetary roller set has exactly three different basic planetary rollers. It has been shown that a very large range of diameters for the threaded lead screws can be covered with only three basic planetary rollers through multiple arrangement of a basic planetary roller in the provided planetary roller set. This limitation to three basic planetary rollers reduces the likelihood that the taken planetary rollers will be arranged in an incorrect sequence on the threaded lead screw or in the lead screw nut. The pitch diameters of all of the basic planetary rollers of a common basic planetary roller set are the same size, but differ from the pitch diameter of the basic planetary rollers of a different basic planetary roller set. This different graduation of the pitch diameters supports the better ability to distinguish between the basic planetary roller sets and can be so pronounced that incorrect assembly is excluded. The pitch diameters can be optimally adapted to the corresponding number of threads—greater lead for increasing number of threads. Through skillful arrangement of the planetary roller-side groove profiles, a method according to the invention is enabled in which, for example, for a double-thread threaded lead screw with large lead screw diameter, a planetary roller set with 12 planetary rollers is assembled that are taken from a common basic planetary roller set that has only three different basic planetary rollers. Each of these three basic planetary rollers can then be used four times: twice with one orientation and twice with the opposite orientation.

However, it is also to possible to provide a basic planetary roller set according to the invention that can be formed from only two or four basic planetary rollers.

All of the planetary rollers of a planetary roller set advantageously have equal length and are arranged axially aligned relative to each other. In this way, it is possible without any problem to hold all of the planetary rollers of the planetary roller set in flanged wheels; these flanged wheels provide that the planetary rollers remain arranged distributed at regular distances across the circumference.

The basic planetary roller sets advantageously have no basic planetary rollers with an axis of symmetry that coincides with a center vertical line with respect to the rotational axis of the planetary rollers. Such planetary rollers designated here as non-symmetric have a planetary roller-side groove profile whose section provided for the rolling engagement with the threaded lead screw is positioned in the axial direction so that the adjacent planetary rollers can be arranged axially aligned. These non-symmetric planetary rollers can also be inserted as in EP1978283 in a common planetary roller set twice with opposing orientation. In contrast, a symmetric planetary roller can be inserted within a planetary roller set only once if an axially aligned arrangement of all planetary rollers of a planetary roller set is desired.

In one advantageous construction of the invention, the planetary roller-side groove profile of all planetary rollers of the planetary roller set can have a middle groove profile and two outer groove profiles located at the two axial sides of the middle groove profile; the planetary rollers can engage with their middle groove profile in the thread profile of the threaded lead screw and with their outer groove profiles in the nut-side groove profile of the threaded nut. Circumferentially adjacent planets have, corresponding to a lead of the thread profile and corresponding to their circumferential distance, middle groove profiles that are arranged axially offset relative to each other, wherein the planetary rollers of the planetary roller set are arranged with uniform circumferential distance to each other and axially aligned in the lead screw nut.

For these planetary rollers described last, the outer groove profiles of the planetary roller-side groove profile can have the same shape for all basic planetary rollers of a basic planetary roller set.

The invention also provides a kit for carrying out the method according to the invention. A kit means that, for example, a catalog or software is provided, wherein threaded lead screws with different numbers of threads and with different lead screw diameters are offered for selection. This kit also has, for each number of threads of the threaded lead screws, a basic planetary roller allocated only to this number of threads, wherein a defined—that is, allocated only to this threaded lead screw type—basic planetary roller set can be allocated to each threaded lead screw with the same number of threads independent of its lead screw diameter, wherein the basic planetary rollers of the allocated basic planetary roller set are provided for forming the planetary roller set; and wherein the planetary roller set, depending on the lead screw diameter of the threaded lead screw of each of the provided basic planetary rollers, has only one or a multiple of one or more of these basic planetary rollers. In other words: all of the planetary rollers of the planetary roller set are derived from the basic planetary roller set allocated to this threaded lead screw type.

The arrangement of the planetary rollers selected according to the invention within a planetary roller set, that is, its sequence and its orientation, is given from the geometry of the threaded lead screw. This arrangement is described, for example, in EP1978283 A2 cited above.

The basic planetary rollers of a basic planetary roller set and its copies can be marked in the assembled planetary roller set in order to simplify and inspect the installation sequence and installation orientation.

BRIEF DESCRIPTION OF THE DRAWINGS

The invention is explained in more detail below with reference to five figures. Shown are:

FIG. 1 in schematic view, a single-thread planetary screw drive produced according to the method according to the invention from a kit according to the invention, FIG. 2 the planetary roller set used in the planetary screw drive according to FIG. 1, FIG. 3 in schematic view, another double-thread planetary screw drive produced according to the method according to the invention from the kit according to the invention, FIG. 4 a section of a winding uncoiled into the plane in a double-thread planetary screw drive according to the invention according to FIG. 3, and FIG. 5 a section of a winding uncoiled into the plane in another double-thread planetary screw drive according to the invention with the same planetary rollers as in FIG. 3.

DETAILED DESCRIPTION OF THE PREFERRED EMBODIMENTS

FIGS. 1 and 2 show a first example of a planetary screw drive that was produced according to the method according to the invention from a kit according to the invention.

A lead screw nut 1 is arranged according to FIG. 1 on a single-thread threaded lead screw 2. In a ring gap 3 formed by the lead screw nut 1 and the threaded lead screw 2 there is a planetary roller set 4 that is formed from several different planetary rollers 5.

The planetary rollers 5 are shown in FIG. 2. A total of six planetary rollers 5 are used, of which three have different shapes relative to each other; these different types are designated below with type A, type B, and type C.

All of the planetary rollers 5 are provided with a planetary roller-side groove profile 6 that has a middle groove profile 6a and outer groove profiles 6b and 6c placed on the two axial sides of the groove profile 6a. This groove profile 6 consists of endless grooves 7 that are arranged around the planetary rollers and parallel to a plane arranged perpendicular to the rotational axis of the planetary rollers 5. These grooves 7 are limited by endlessly circulating teeth 8 that have tooth flanks, wherein these tooth flanks end in a tooth tip.

The planetary rollers 5 shown here each have two middle groove profiles 6a that are arranged at an axial distance to each other and are provided with outer groove profiles 6b and 6c on its two axial sides.

The middle groove profile 6a is provided for engagement in a thread profile of the threaded lead screw 2 not shown in more detail. The outer groove profile 6b, 6c is provided for engagement in a nut-side groove profile of the lead screw nut 1 not shown in more detail.

Three different types of planetary rollers 5 are provided; two planetary rollers 5 of type A, two planetary rollers 5 of type B, and two planetary rollers 5 of type C. The types A, B, C differ in that the middle groove profiles 6a are axially offset relative to each other by a pitch offset delta T. This pitch offset is specified by the lead of the thread profile of the threaded lead screw 2: if all of the planetary rollers 5 arranged distributed around the circumference are arranged axially aligned—as shown in FIG. 2—circumferentially successive planetary rollers 5 must have an axially offset middle groove profile 6a based on the lead; this pitch offset is dependent on the circumferential distance of adjacent planetary rollers 5.

None of the three types of planetary rollers 5 is mirror-symmetric to an axis that coincides with a middle vertical line that is set up on the rotational axis of the planetary rollers 5 in the axial middle of the planetary rollers. This means the sequence and orientation of the planetary rollers 5 in the planetary screw drive is specified. In FIG. 2, the types A, B, C are arranged in one orientation and the types A, B, C are arranged in the opposite orientation. The shown sequence is provided for the single-thread planetary screw drive according to FIG. 1.

FIG. 3 shows, in a schematic view, another double-thread planetary screw drive that differs from the planetary screw drive according to FIG. 1 essentially by a double-thread threaded lead screw 11 and by a changed planetary roller set 12 formed from planetary rollers 9.

FIG. 4 shows a section of a winding uncoiled in the plane in a double-thread planetary screw drive according to the invention according to FIG. 3, but with modified planetary rollers 9 that have only one middle groove profile 9a and outer groove profiles 9b, 9c located at its axial sides.

In the double-thread planetary screw drive according to FIGS. 3 and 4, three different types A, B, C—as in the first embodiment—are provided with a pitch offset delta T of the middle groove profile 9a. These planetary rollers 9 are distributed in the shown sequence across the circumference arranged around the threaded lead screw 2. This arrangement corresponds to the image in FIG. 3. The thread profile 10 uncoiled in the plane is to be clearly taken with the schematically indicated two threads. A continuous line shows one thread of the double-thread thread profile 10 and a dashed line shows the other thread. The lead P of the thread profile 10 indicates the axial distance between a start and an end of one full winding of the thread profile 10. The pitch T indicates the axial distance between the grooves of the adjacent threads.

According to the method according to the invention, the planetary roller set 12 shown in FIGS. 3 and 4 were derived from basic planetary rollers of a basic planetary roller set in which all of the basic planetary rollers were each selected twice, wherein the orientation of the planetary rollers 9 of type B were arranged opposite the orientation of the planetary rollers 9 of types B and C.

FIG. 5 shows a section of a winding uncoiled in the plane in another double-thread planetary screw drive according to the invention with the same planetary rollers 9 as in FIG. 4. The difference with the embodiment according to FIG. 4 consists in that the lead screw diameter of the threaded lead screw was increased considerably and instead of six planetary rollers 9 of types A, B, C, a total of 12 planetary rollers 9 of types A, B, C were used. These 12 planetary rollers 9 form a complete planetary roller set 13. In this embodiment, all of the types are arranged in both, that is opposite, orientations around the lead screw axis.

In these three described embodiments, the three planetary roller sets 4, 12, 13 are assembled from two basic planetary roller sets.

The planetary roller set 4 is assembled from a first basic planetary roller set that is formed by the three basic planetary rollers 5, one of type A, one of type B, one of type C. Each basic planetary roller 5 is provided twice in the planetary roller set 4.

The planetary roller set 12 is assembled from a second basic planetary roller set that is formed by the three basic planetary rollers 9, one of type A, one of type B, one of type C. Each basic planetary roller 9 is provided twice in the planetary roller set 12.

The planetary roller set 13 is assembled just like the planetary roller set 12 from the second basic planetary roller set that is formed by the three basic planetary rollers 9, one of type A, one of type B, one of type C. Each basic planetary roller 9 is provided four times in the planetary roller set 13.

The kit according to the invention provides for threaded lead screws of the same number of threads and different diameters of a common basic planetary roller set from which the planetary rollers of each planetary roller set are assembled. The selection and assembly of the planetary rollers from the kit allows the production of planetary screw drives that allow a problem-free rolling contact between the planetary roller and threaded lead screw.

The sequence and orientation of the planetary rollers within a planetary roller set is given from the geometry of the threaded lead screw.

In all of the embodiments described here, the planetary rollers are arranged distributed uniformly across the circumference of the threaded lead screw.

LIST OF REFERENCE NUMBERS

1 Lead screw nut
2 Threaded lead screw
3 Ring gap
4 Planetary roller set
5 Planetary roller 6 Planetary roller-side groove profile
6a Middle groove profile
6b Outer groove profile
6c Outer groove profile
7 Groove
8 Tooth
9 Planetary roller
9a Middle groove profile
9b Outer groove profile
9c Outer groove profile
10 Thread profile
11 Double-thread threaded lead screw
12 Planetary roller set
13 Planetary roller set

The invention claimed is:

1. A method for producing a planetary screw drive, wherein the planetary screw drive comprises:
- a threaded lead screw with a thread profile with n threads, where "n" is a natural number,
- a lead screw nut arranged on the threaded lead screw,
- a planetary roller set that is formed from planetary rollers arranged across a circumference, wherein a planetary roller-side groove profile of the planetary rollers of the planetary roller set is in rolling engagement with a nut-side groove profile of the lead screw nut and with a thread profile of the threaded lead screw, the method comprising:
- forming multiple separately defined basic planetary roller sets including basic planetary rollers that are different from each other and have different planetary roller-side groove profiles,
- a first one of the defined basic planetary roller sets consists of planetary rollers having a same number of threads,
- wherein one of the defined basic planetary roller sets is allocated to each number of the threads of the threaded lead screws, and
- the basic planetary rollers of said first one of the planetary roller sets having different pitch circle diameters than the basic planetary rollers of a second one of the defined basic planetary roller sets.

2. The method according to claim 1, wherein each of the basic planetary roller sets has exactly three of the basic planetary rollers that are different from each other.

3. The method according to claim 1, wherein all of the planetary rollers of said first one of the planetary roller sets have equal length and are in an axially aligned arrangement.

4. The method according to claim 1, wherein each of the defined basic planetary roller sets includes only the basic planetary rollers that lack an axis of symmetry that coincides with a center vertical line with respect to a rotational axis of the basic planetary rollers.

5. The method according to claim 1, wherein all of the planetary rollers of one of the planetary roller sets for threaded lead screws with the same number of threads are taken, independent of a lead screw diameter of the threaded lead screw, from a same one of the defined basic planetary roller sets.

6. A kit for carrying out the method according to claim 1, including the threaded lead screws with different numbers of threads and different lead screw diameters and, for each number of threads of the threaded lead screws, one of the basic planetary roller sets allocated only to said same number of threads, at least one set of the defined basic planetary roller sets is allocated to each of the threaded lead screws with the same number of threads independent of a lead screw diameter thereof, and all of the basic planetary rollers of the allocated basic planetary roller set are provided for forming the planetary roller set and the planetary roller set has, depending on the lead screw diameter of the threaded lead screw of each of the basic planetary rollers, only one or more times one or more of said basic planetary rollers.

7. A method for producing a planetary screw drive, wherein the planetary screw drive comprises:
- a threaded lead screw with a thread profile with n threads, where "n" is a natural number,
- a lead screw nut arranged on the threaded lead screw,
- a planetary roller set that is formed from planetary rollers arranged across a circumference, wherein a planetary roller-side groove profile of the planetary rollers of the planetary roller set is in rolling engagement with a nut-side groove profile of the lead screw nut and with a thread profile of the threaded lead screw, the method comprising:
- forming multiple defined basic planetary roller sets including basic planetary rollers that are different from each other and have different planetary roller-side groove profiles,
- a first one of the defined basic planetary roller sets consists of planetary rollers having same number of threads, wherein one of the defined basic planetary roller sets is allocated to each number of the threads of the threaded lead screws, and
- the basic planetary rollers of said first one of the planetary roller sets having different pitch circle diameters than the basic planetary rollers of a second one of the defined basic planetary roller sets,
- wherein the planetary roller-side groove profile of all of the basic planetary rollers of the defined basic planetary roller sets has a middle groove profile and also two outer groove profiles located on both axial sides of the middle groove profile,
- the basic planetary rollers engage with said middle groove profile in the thread profile of the threaded lead screw and with said outer groove profiles in the nut-side groove profile of the lead screw nut, and
- the basic planetary rollers arranged adjacent to each other circumferentially have, corresponding to a lead of the thread profile and corresponding to a circumferential distance to each other, ones of the middle groove profiles that are arranged axially offset relative to each other, and the planetary rollers of the planetary roller sets are arranged with equal circumferential distance to each other and axially aligned in the lead screw nut.

* * * * *